United States Patent
Sone et al.

[11] 3,910,698
[45] Oct. 7, 1975

[54] PHOTOGRAPHIC APPARATUS

[75] Inventors: Yoshiaki Sone; Kazuo Kashiwagi, both of Tokyo, Japan

[73] Assignee: Canon Kabushiki Kaisha, Tokyo, Japan

[22] Filed: June 7, 1973

[21] Appl. No.: 367,841

[30] Foreign Application Priority Data
June 17, 1972 Japan.............................. 47-71001

[52] U.S. Cl..................................... 355/54; 355/75
[51] Int. Cl.² .................. G03B 27/62; G03B 27/32
[58] Field of Search ............ 355/53, 54, 40, 86, 96, 355/75; 95/31 DS; 354/27

[56] References Cited
UNITED STATES PATENTS

| | | | |
|---|---|---|---|
| 2,354,273 | 7/1944 | Olden | 95/31 DS |
| 2,645,170 | 7/1953 | Heidecke | 95/31 DS |
| 3,591,282 | 7/1971 | Renold | 355/54 |
| 3,680,461 | 8/1972 | Amesbury | 355/53 X |
| 3,689,149 | 9/1972 | Livingood | 355/54 X |
| 3,712,202 | 1/1973 | Lang | 355/54 X |
| 3,767,302 | 10/1973 | Roberts et al. | 355/54 X |

*Primary Examiner*—Samuel S. Matthews
*Assistant Examiner*—E. M. O'Connor
*Attorney, Agent, or Firm*—William R. Woodward

[57] ABSTRACT

A photographic apparatus for photographing a number of images in rows and columns on a roll of long film comprises a carrier for holding the film in exposure position disposed within the apparatus housing, and a film supply magazine including a spool therein. The film supply magazine is of a transverse width sufficiently greater than that of the film. The spool has the film wound thereon and is designed to permit free lateral displacement of the film wound thereon. A film receiving magazine is provided for receiving therein the film transported from the exposure position, and means is provided to laterally move the carrier.

17 Claims, 4 Drawing Figures

PHOTOGRAPHIC APPARATUS

BACKGROUND OF THE INVENTION

1. Field of the Invention

This invention relates to a photographic apparatus, and more particularly to a microfiche camera for photographing a number of images in rows and columns on a roll of long film or the like.

2. Description of the Prior Art

In the conventional microfiche camera for photographing a plurality of images within a corresponding number of frames on a roll of long film, the following procedures are involved as will be seen in FIG. 1 of the accompanying drawings. First, a picture is taken in a region A1 on the web of film F from a supply roll, and then the film is transported lengthwise thereof by an interframe distance $l_1$, whereafter a picture is taken in a region A2. In this way, pictures are successively taken in the row A up to a region A12, for example. Thereafter, the film is transported in the opposite direction until the initial position of the film is restored, and then the film is now moved widthwise thereof by an interframe distance $l_2$, whereupon a picture is taken in a region B1. Thereafter, the film is transported lengthwise thereof to take pictures in the successive regions of the row B, in the same manner as described with respect to the row A. In this manner, photography is repeatedly effected from row to row until a picture has been taken in the last region F12, thus completing photography on a first section of the microfiche. Thereafter, a second section of the microfiche is subjected to photography in a similar manner.

Alternatively, a picture may be taken in the region A1, whereafter photography shifts to the region B1 widthwise of the film, and thence up to the region F1 in a first column. Subsequently, photography shifts to a second and subsequent columns until the last region in the last column has been exposed, thus completing photography on a first section of the microfiche.

In either of the described methods, taking pictures in rows and columns on the film F involves the widthwise movement of the film itself or the widthwise movement of the lens system. For this reason, in the conventional camera of such type, a film carrier for holding the film drawn out of a film magazine in exposure position has been made movable within the camera widthwise of the film so that the displacement of the frames in the direction of columns occurs with the widthwise movement of such carrier, while the displacement of the frames in the direction of rows is effected by the forward or the reverse transport of the film itself. However, since the film magazine is immovably fixed to the camera, the widthwise movement of the film carrier imparts to the film such a torsion that would prevent the film from being properly held in exposure position. To prevent such torsion from forming an inconvenience in picture-taking, the prior art has resorted to a buffer mechanism for causing the film to form a large suspended slack or loop and for preventing such loop from being contracted even by the transported film. The buffer mechanism has comprised a lever mechanism or a photoelectric device for detecting the looped condition of the film and for automatically transporting the film to correct the loop when there is any change in the loop which exceeds a predetermined loop condition. This has necessarily led to a larger size and greater complexity of the entire camera or photographic apparatus.

There is another type of system whereby the film magazine is fixed to the carrier and the two are moved together. This makes the carrier heavier in weight, which in turn means a greater load imparted to the drive source for the carrier as well as the impossibility of starting and stopping the carrier at high speeds. Such type of system is particularly unsuitable for use in the cameras for computer output microfilm (COM), because these cameras have to photograph the output information from a computer on a microfilm at a high speed.

SUMMARY OF THE INVENTION

It is therefore an object of the present invention to overcome the above-noted drawbacks peculiar to the prior arts.

It is another object of the present invention to provide a photographic apparatus which is capable of photographing images in rows and columns on a roll of long film at a high speed.

It is still another object of the present invention to provide such a photographic apparatus which is simpler in construction and smaller in size.

It is yet another object of the present invention to provide such a photographic apparatus which eliminates the need to intentionally form a loop of film between a film magazine and a film carrier and to employ a complex buffer mechanism.

It is a further object of the present invention to provide an apparatus which employs a film supply magazine fixed to the body of the apparatus, the magazine being of a width about double that of the film in use and having a film supply port and a spool both of a length about double the width of the film, and in which the roll of film is supported on the spool for freedom of lateral displacement and rotation so that the lateral movement of the film carrier causes free lateral displacement of the outermost layer on the roll of film.

Other objects and features of the present invention will become fully apparent from the following detailed description of a preferred embodiment thereof taken in conjunction with the accompanying drawings.

DESCRIPTION OF THE PREFERRED EMBODIMENTS

Figure 1:
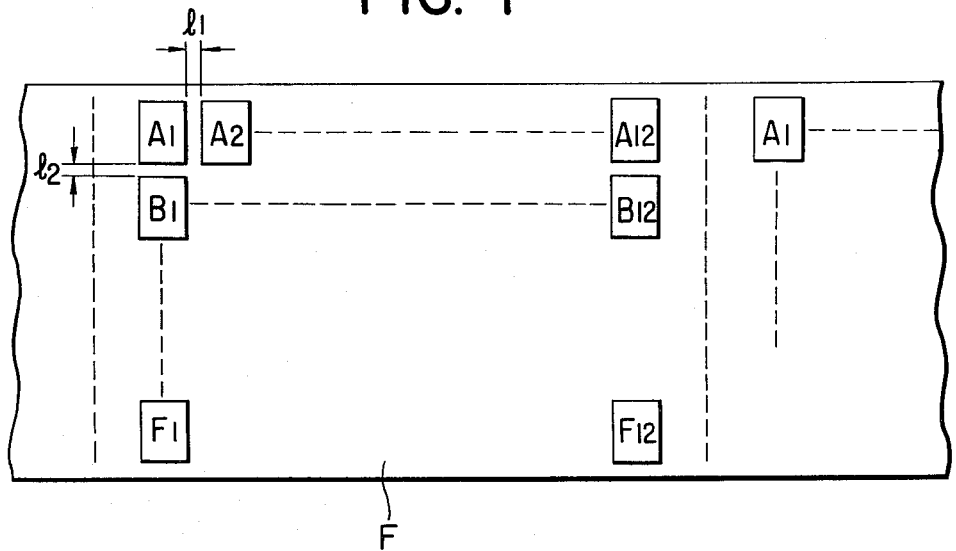
FIG. 1 is an enlarged, fragmentary plan view of a microfilm for illustrating the manner in which images are photographed in rows and columns on the film.
Figure 2:
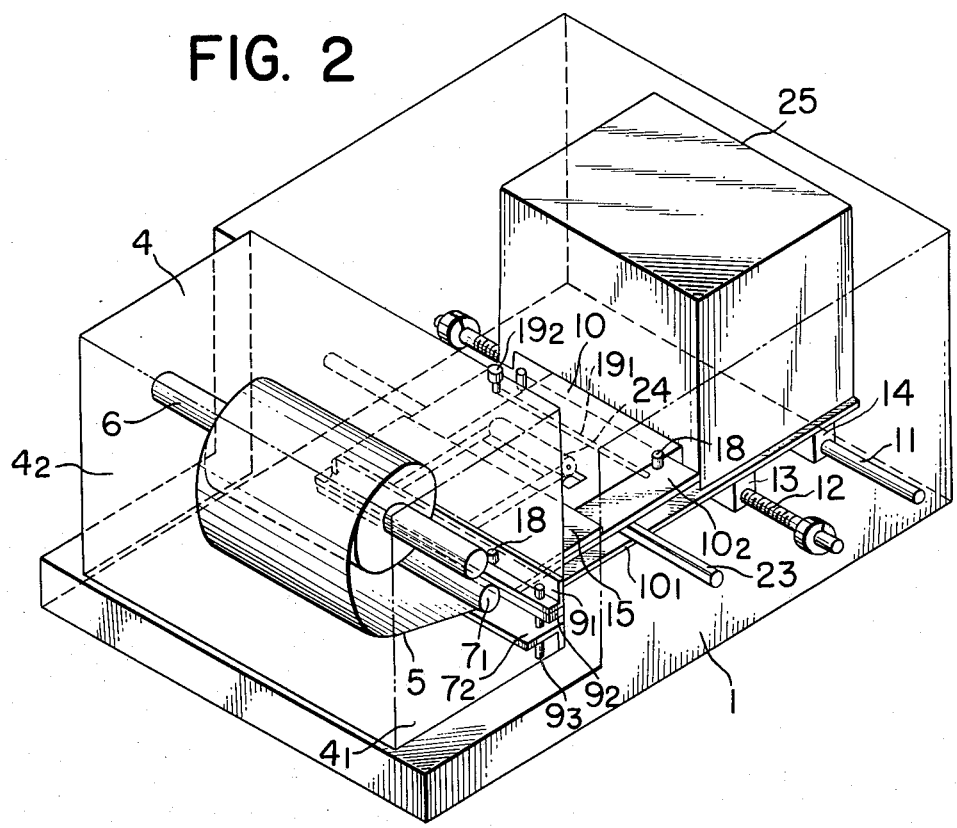
FIG. 2 is a perspective view showing the essential parts of the apparatus according to the present invention.
Figure 3:
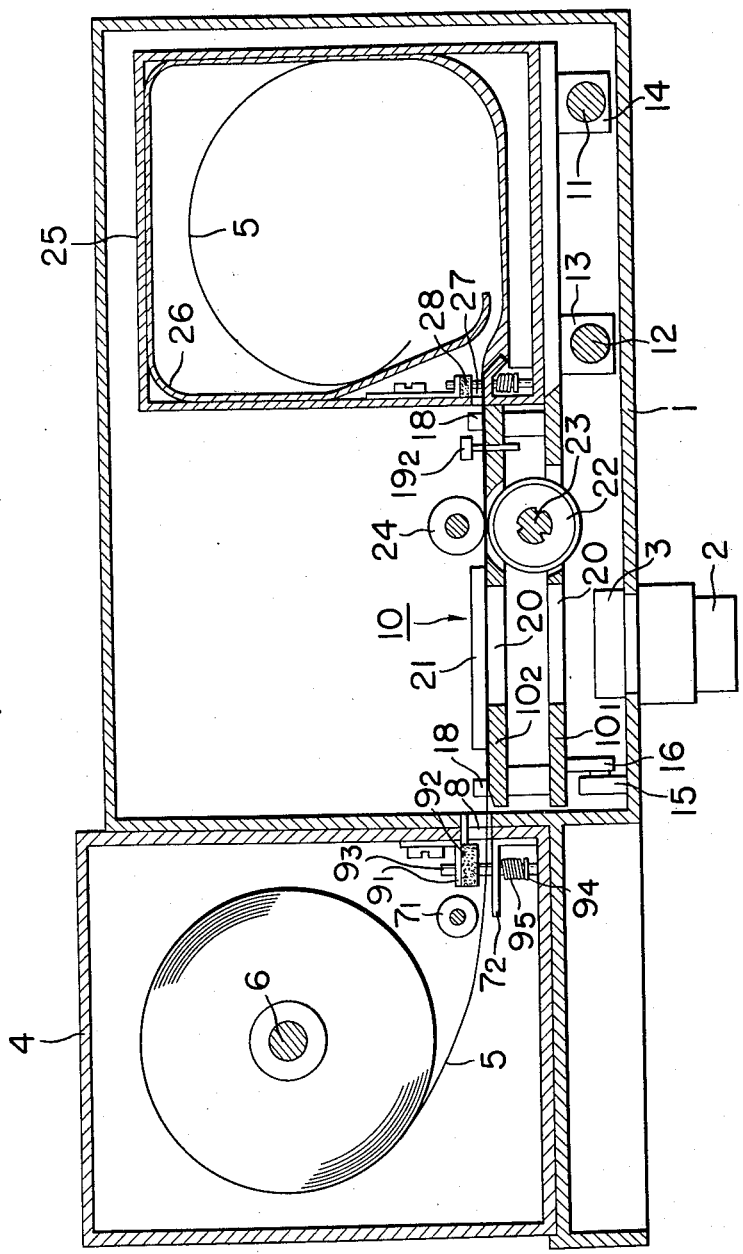
FIG. 3 is a longitudinal vertical cross-section of the apparatus shown in FIG. 2.

Referring to FIGS. 2 and 3, a camera body housing is generally designated by numeral 1 and a photographic lens 2 is mounted in the camera body housing 1, the lens 2 being provided with a shutter 3. A film supply magazine 4 is detachably mounted in the magazine receiving portion of the body housing 1. The film supply magazine 4 is in the form of a box having opposite side walls $4_1$ and $4_2$, between which is rotatably mounted a film spool 6 for supporting thereon a roll of long microfilm 5. Unlike the conventional spool, the spool 6 has no flange for restricting the widthwise movement of the film nor it has any friction means with respect to the magazine, thus facilitating the rotation of the spool. The magazine 4 is of a transverse width about double that of the film and a film supply port 8 of a corresponding transverse width is formed in the magazine 4. Disposed within the magazine 4 is a film guide roller $7_1$ and a guide plate $7_2$, and an L-shaped receiver means $9_1$ is located above the guide plate $7_2$. In the opposite end portions of the receiver means $9_1$ and guide plates $7_2$, through-apertures (not shown) are formed in vertically aligned relationship with each other for receiving a pair of actuator rods $9_3$ which hold a light-intercepting member $9_2$ adapted to cover and uncover the film supply port 8. The light-intercepting member $9_2$ may be formed of a soft material such as sponge rubber or woolen cloth which would impart no injury to the film. Each eactuator rod $9_3$ has a projection $9_4$, and a coil spring $9_5$ is wound around each rod $9_3$ between the projection $9_4$ thereof and the guide plate $7_2$. The coil spring normally urges the actuator rod $9_3$ downwardly so that the lower end of the rod extends outwardly through an aperture fromed through the bottom wall of the magazine. Upon mounting of the magazine 4 to the camera body housing 1, the actuator rods $9_3$ may be raised upwardly against the force of the coil spring by the body housing, whereby the light-intercepting member $9_2$ may be displaced from a position for covering the supply port 8 to a position for uncovering the supply port 8, thereby permitting the passage of the film 5 from within the magazine 4 into the camera body housing. Upon removal of the magazine 4 from the camera body housing 1, each actuator rod $9_3$ may be returned to its original position by the action of the coil spring $9_5$, whereby the light-intercepting member $9_2$ may restore its original position to cover the supply port 8 again. An opening corresponding in transverse width to the film supply port 8 is formed through the side wall of the body housing 1 which is opposed to the port 8.

Within the camera body housing 1, a film carrier 1 is mounted for transverse movement and may hold the film 5 passed through the supply port 8 in exposure position. A guide rail 11 is provided for the film carrier, and a screw shaft 12 for moving the film carrier is connected to a drive motor (not shown) so as to be rotated thereby to move the carrier 10 transversely of the film. The film carrier 10 includes a pair of vertically spaced apart, parallel, flat plates $10_1$ and $10_2$. The lower plate $10_1$ is provided with a downwardly directed projection 13 having an internally threaded bore formed therethrough and mating with the screw shaft 12, and a downwardly directed guide projection 14 located adjacent one end of the plate $10_1$ and mating with the guide rail 11. The lower plate $10_1$ has a second downwardly directed guide projection 16 formed adjacent the other end thereof and engaged with a retainer roller 15 provided within the body housing 1. The upper plate $10_2$ is provided with a pair of studded pins 18 horizontally spaced apart a distance slightly greater than the transverse width of the film 5, and a film cutter $19_2$ movable in a slit $19_1$ formed through the upper plate $10_2$.

The lower and upper plates $10_1$ and $10_2$ are provided, at the central portion thereof, with apertures 20, the long dimension of which (transverse to the film) corresponds to the height of a column or the width of the film and the short dimension or width of which corresponds to the width of a frame (in the longitudinal direction of the film).

A film pressing plate 21 for pressing the film 5 against the top surface of the film carrier 10 is provided on the top of the carrier. A capstan roller 22 for transporting the film is mounted on a spline shaft 23 disposed within the camera body housing 1, and is movable on the spline shaft 23 transversely of the film together with the carrier 10. A pinch roller 24 is provided to urge the film 5 into engagement with the capstan roller 22. The spline shaft 23 is connected to a drive motor (not shown) disposed outside the carrier 10 and may be rotatively driven from the motor to thereby rotate the capstan roller 22 so as to transport the film between the rollers 22 and 24 in the forward or the reverse direction as desired. A film receiving magazine 25 is supported on the lower plate $10_1$ of the carrier 10.

The film receiving magazine 25 has a film guide memeber 26 coated with fluoric resin and extending substantially along the inner periphery of the magazine 25 and has a film reception port 27 so that the film 5 may pass through the port 27 into the receiving magazine 25 and move along the guide member 26 for storage within the magazine 25 in a curling manner as shown in FIG. 3. Within the magazine 25, there is provided a light-intercepting member 28 for covering and uncovering the reception port 27 but this need not be described further since it is similar in construction to the light-intercepting member $9_2$ described previously.

Figure 4:
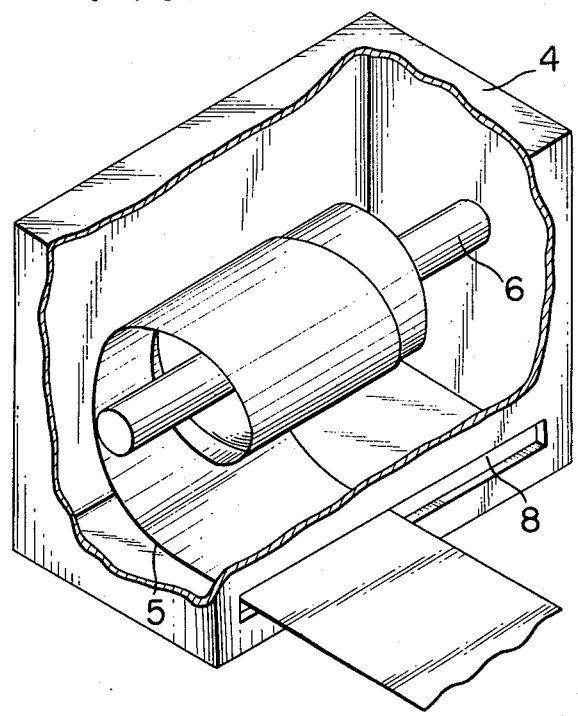
FIG. 4 is a perspective view illustrating the manner in which the outermost layer of the rolled film in the film supply magazine used with the apparatus of the present invention is laterally displaced.

In the above-described arrangement, the film 5 is wound medially on the spool 6 and located centrally of the magazine 4. During photography, the film is moved lengthwise thereof by the capstan roller 22 being driven, in the same manner as in the conventional magazine. When photography is to be effected in the direction of columns, the screw shaft 12 may be operated to move the film carrier 10 and the film with it transversely of the film, whereby the outermost layer of the rolled film 5 in the magazine 4 may be laterally displaced in the manner as shown in FIG. 4 while the spool 6 is being rotated slightly, so that photography may take place in region of the film which corresponds to the extent of lateral movement of the carrier 10. When photography is to be effected in a row nearest to one side edge of the film web, the film may be transported lengthwise dimension by roller 22 so that the outermost layer of the film may be led out from its position already laterally displaced on spool 6 by the lateral positioning of carrier 10. If the film has to be rewound, it may be freely propelled back into the magazine 4 by roller 22 without encountering any obstruction. Such operation can be accomplished because the magazine 4 has a sufficiently greater width than that of the film and because the spool 6 has no film-passage restricting flange and is held in a frictionless manner. The successive portions of the film once exposed may be forced into the film receiving magazine with the longitudinal transport of the film imparted by the capstan roller 22, whereafter the film may be self-curled and stored in a rolled form. After a desired amount of the fiche film has been exposed, the exposed portion of the film may be severed off by the cutter $19_2$ and the receiving magazine 25 detached from the carrier 10 to permit the exposed film portion therein to be subjected to a developing process. The shown receiving magazine 25 employs no spool and can freely pushed in and is movable with the carrier 10, whereas this magazine may be of the same construction as the supply magazine 4 and fixedly secured to the camera body housing 1.

Thus, in the camera according to the present invention, the width of the film supply magazine and the lengths of the film supply port and the spool in the magazine may all be about double the width of the film and the supply magazine may be detachably secured to the camera body housing. Further, the spool is provided with no film-passage restricting flange so as to permit free lateral movement of the film and in addition, such spool is frictionlessly held for light rotation. Also, the lateral movement of the film carrier is utilized to cause free lateral displacement of the outermost layer on the rolled film, thus eliminating the need to form a loop of film between the magazine and the carrier and provide a buffer mechanism for controlling such looped condition of the film. This leads to a simpler and smaller construction of the camera.

Furthermore, the present invention permits the film carrier to be simple and light in weight, which in turn permits the carrier to be moved and stopped with higher reliability and accuracy during high-speed photography.

The invention has been described with respect to a preferred embodiment thereof, but it should be understood that the above description is merely for the illustrative purpose and various modifications may be possible therein without departing from the spirit and scope of the invention as defined in the appended claims.

We claim:

1. A microfiche camera comprising:
   a camera body;
   a film carrier for holding film on a plane in an exposed position, said carrier being disposed within said camera body;
   means associated with said carrier for laterally shifting the carrier and the film
   a film supply magazine detachably mounted in a stationary position on said camera body and accommodating unexposed film in rolled form, said supply magazine having a film feed opening of a width approximately two times the width of the film and a shaft which provides for free lateral movement, relative to the shaft, of the film wound around it, with said magazine being stationary, when said film carrier moves laterally together with the film;
   means for taking up the film which has passed through the film carrier from said supplying magazine; and
   a pair of opposed rollers mounted on said carrier for feeding the film;
   whereby images are recordable on the film in predetermined intervals in the direction of the width of the film by sequential intermittent shifting of the carrier, and in predetermined intervals in the longitudinal direction of the film by sequential intermittent driving of the rollers.

2. A microfiche camera according to claim 1, wherein one of said rollers is splined with a shaft provided in said camera body, said roller being movable along the last-mentioned shaft in the lateral direction of the film, in accordance with the movement of said carrier.

3. A microfiche camera according to claim 1, wherein said take-up means includes,
   a case for accommodating the film which has passed through said film carrier, said case having a slot for guiding the film, and
   a member for guiding the film from the last-mentioned slot to curl the film.

4. A microfiche camera according to claim 3, wherein said guide member is coated with fluoric resin at the portion thereof contacting with the film.

5. A photographic apparatus for photographing a number of images in rows and columns on a roll of long film comprising:
   a body housing;
   photographic optical means fixed on said body housing;
   means for holding the film in a position for exposing the film at a selected portion thereof, said holding means being movable with respect to said body housing;
   means for laterally moving said holding means together with film held thereby, said moving means being coupled with said holding means to displace the holding means and the film held thereby relative to said body housing and said photographic optical means;
   means for supplying the film to said holding means detachably mounted in stationary position on said body and having a shaft for rolling the film therearound, said supplying means permitting free lateral displacement of the film with the shaft being stationary with respect to the lateral movement of the film, when the film held by said holding means is laterally displaced together with said holding means, in order to successively expose the film in the lateral direction thereof; and
   means for receiving the film which has passed through said holding means.

6. A photographic apparatus according to claim 5 wherein said supplying means includes a case for accommodating the rolled film and a slot for supplying the rolled film to said holding means, said case and the slot having widths larger than the width of the film.

7. A photographic apparatus according to claim 6, wherein said film case has a lateral width approximately two times the width of the film.

8. A photographic apparatus according to claim 5, wherein said holding means includes means for feeding the film.

9. A photographic apparatus according to claim 8, wherein the shaft of said supplying means is rotatable to provide free longitudinal displacement of the film rolled on the shaft in response to operation of said feeding means.

10. A photographic apparatus according to claim 5, wherein said supplying means is detachable from said body housing.

11. A photographic apparatus according to claim 5, wherein said film receiving means includes a case having a slot, passing therethrough the film which has passed through the holding means, and guide means for curling the film in the case.

12. A photographic apparatus according to claim 11, wherein said guide member is coated with fluoric resin at the portion thereof contacting with the film.

13. A microfiche camera comprising:
   a photographic lens means;
   means for supplying a film detachably mounted in a stationary position relative to said lens means;

means for winding up the film; and film holding means disposed between said supplying means and said winding-up means, said film holding means holding the film at a photographic position;

means for moving said film holding means together with the film in the lateral direction of the film;

said film supplying means having a rotatable shaft which permits free lateral displacement of the film rolled around the shaft, the shaft being stationary with respect to the lateral movement of the film.

14. A microfiche camera according to claim 13, wherein said supplying means includes a case which rotatably supports the shaft of said supplying means, the case having a slot for supplying the film therethrough, and the slot having the length at least two times the width of the film.

15. A microfiche camera according to claim 14, wherein said case is detachable from the camera.

16. A microfiche camera according to claim 13, wherein said holding means includes a carrier for holding the film in place and an opposed pair of rollers provided in the carrier to feed the film.

17. A microfiche camera according to claim 13, further comprising a cutter for cutting the film.

* * * * *